CIRCUIT ARRANGEMENT FOR SIGNALLING THROUGH TELEPHONE LINES

Filed Nov. 15, 1960 2 Sheets-Sheet 1

INVENTOR
ANDERS KARLBY BERGMANN
BY Hane and Nydick
ATTORNEYS

INVENTOR
ANDERS KARLBY BERGMANN
BY Hane and Nydick
ATTORNEYS

United States Patent Office 3,138,668

Patented June 23, 1964

3,138,668

CIRCUIT ARRANGEMENT FOR SIGNALLING THROUGH TELEPHONE LINES

Anders Karlby Bergmann, Galion, Ohio, assignor to Telefonaktiebolaget L M Ericsson, Stockholm, Sweden, a corporation of Sweden Filed Nov. 15, 1960, Ser. No. 69,376
2 Claims. (Cl. 179—18)

The present invention refers to signal sending through a junction line between two automatic telephone exchanges, the junction line being arranged for sending signals simultaneously in both directions. The purpose of the invention is to carry out and control the disconnection of a communication as well from the called as from the calling telephone exchange.

In hitherto known signal systems for junction lines it is known that calling and clearing signals are answered with a control signal, which shows that the signal sent out has been received. The signalling presupposes that the communication has a determined direction and that that telephone exchange, which has called, is responsible for the disconnection. Line equipments to junction lines with two-directional traffic are provided with arrangements for switching the signalling in dependence on the traffic direction of the connection.

According as more and more long and expensive lines are used for automatic telephone traffic, the wish arises to be able to disconnect a connection independently of the traffic direction, so that the disconnection can be carried out from any telephone exchange included in the connection, in which there is reason for disconnecting the connection.

According to the invention this is achieved in a simple and suitable way by means of a line equipment at each end of the junction line comprising means for sending clearing signals and means for receiving clearing signals through the junction line, an arrangement for marking the setting up of a communication through the line and a time arrangement, which is operated by said means for receiving clearing signals and which after a definite time period temporarily interrupts the sending out of a clearing signal produced by said sending means, and by means of contact means which operate the sending means each time a clearing signal is received in or is initiated from the line equipment, so that the receiving of a clearing signal causes sending of a clearing signal through the junction line until said time arrangement interrupts the signal sending, upon which said arrangement for marking the setting up of the communication is held in dependence on said means for receiving the clearing signal and repeated clearing signals are sent out with time intervals from the line equipment until the clearing signal coming from the junction line ceases.

The invention will be further described with reference to the enclosed drawing, FIGS. 1–4.

Figure 1:
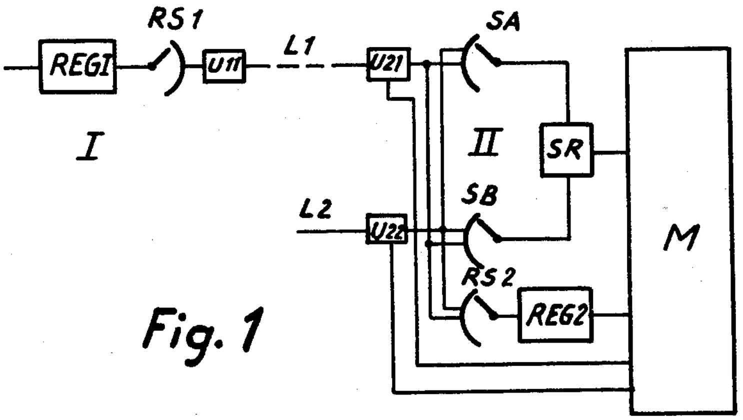
FIG. 1 shows a survey diagram for a connection being set up between two telephone exchanges I and II.

In FIG. 1 is shown a register REG1 in a calling telephone exchange I. The register REG1 is temporarily connected through a selector RS1 to a junction line L1 which connects the telephone exchange I with a telephone exchange II. The junction line L1 is connected to the telephone exchanges I and II through line equipments U11 and U21 respectively.

In the telephone exchange II there is shown on one hand a link SR with pertaining selecting means SA and SB, on the other hand a register REG2 with a finder RS2 for connecting the register to any junction line L1–L2 that is connected to the exchange. Furthermore, a marker M is shown, which sets all connections in the telephone exchange II.

Here it is presupposed that the register REG1 is connected to the line L1 and sends a calling signal, which causes that the line L1 is connected to the register REG2 through the finder RS2 by means of the marker M principally as described in U.S. Patent 2,761,901, FIGURE 5 thereof. According to said patent, a signal from the register continues until a revertive signal is received. In accordance with the present invention all line equipments U11, U21, U22 are supposed to be reciprocally alike, although this, of course, is not necessary.

Figure 2:
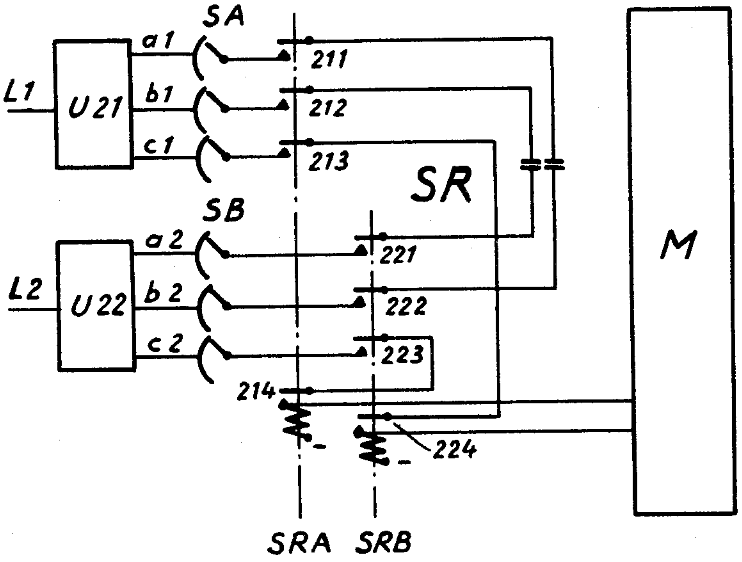
FIG. 2 shows a draft of a link in a telephone exchange.
Figures 3, 4:
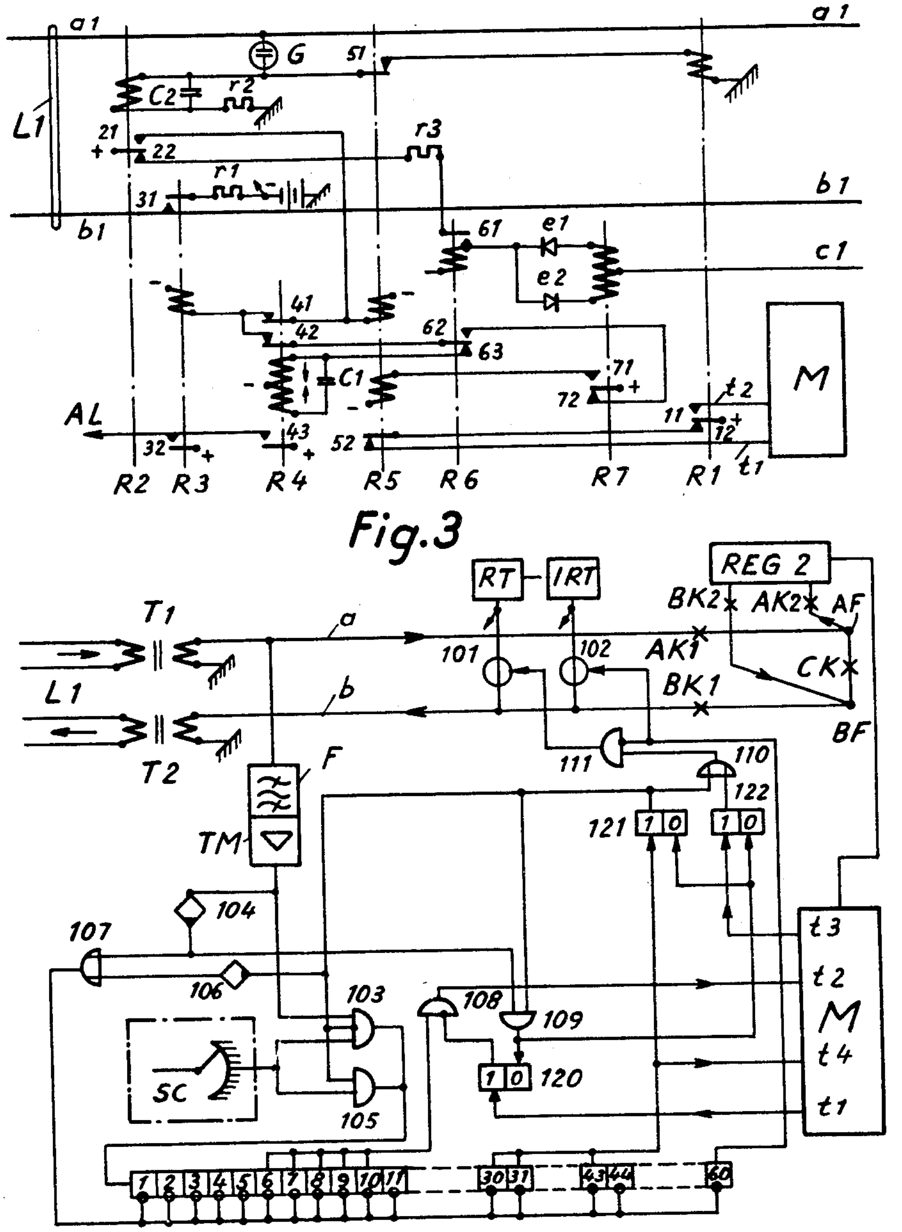
FIG. 3 shows a line equipment for a two-conductor line having direct current signalling.
FIG. 4 shows a line equipment for connecting a 4-conductor line to an electronic telephone exchange designed according to an automatic telephone system with time division multiplex.

FIG. 2 shows the link SR in the telephone exchange II, and FIG. 3 shows a line equipment, for example U21, according to an embodiment intended for two-conductor lines, one line conductor of which is used for signals in one direction and the second line conductor of which is used for signal sending in the opposite direction. The signals consist of current impulses of short duration from a direct current source with earth return. During the conversation the junction line is free from signalling current.

Each line equipment consists of seven relays R1–R7 and a glow tube G. The speaking wires *a*1, *b*1 are, when the glow tube is extinguished and the contact 31 is in rest, completely insulated from earth. The link SR comprises two holding relays SRA and SRB.

The calling signal from the register REG1 through the line L1 operates the calling relay R1 in FIG. 3 in a circuit through the line conductor *a*1, the glow tube G and the contact 51. At the same time the signal receiving relay R2 receives current. The relay R2 is, however, slow in operation in consequence of a capacitor C2 and a series resistance *r*2, for which reason this relay cannot be operated for the present. The contacts 11–12 are actuated and the marker M is called through a circuit through the wire *t*2. The contact 12 interrupts the idle-marking for the line L1, so that the marker M, if it is busy and hunts a free junction line to the exchange I, finds the test circuit through the wire *t*1 interrupted. The marker M carries out very swift switching processes and is here supposed to set up immediately a connection between the line L1 and a register REG2. Hereby the relays R6 and R7 are operated by a current impulse through the wire *c*1. The contacts 61–63 and 71–72 are actuated. At the operation the relay R7 receives current through its upper winding and the rectifier *e*1. After this the relays R6 and R7 are kept energized through the resistance *r*3 and the contacts 22 and 61, the relay R7 receiving current through the rectifier *e*2 and its lower winding in series with a holding relay in the register REG2 connected to the wire *c*1. A similar switching process will be described below for the link SR according to FIG. 2.

Relay R5 receives current through the contact 71 and operates. The contacts 51–52 are actuated. The relay R1 releases and the marker is released. The calling signal is now received through the wire *a*1 in the register REG2, which as answering signal connects negative to the wire *b*1. Hereby a relay in the register REG1 is operated, whereby the calling signal is interrupted, which in its turn causes that the answering signal is interrupted. A connection between the two registers REG1 and REG2 is hereby established and the digit signal is transmitted through the line L1 from REG1 to REG2. The digit signals are supposed to consist of voice frequencies, which are sent in known manner through the speaking wires *a*1 and *b*1.

If the connection cannot be effected for some reason, for example if no idle register REG2 is provided, the calling signal will remain on the line and the relay R2 in FIG. 3 operates. The contacts 21–22 are actuated. The relay R3 receives current through the contacts 21 and 41 and operates. The contacts 31–32 are actuated and a clearing signal is sent through the resistance *r*1 through the contact 31 and the line conductor *b*1 of the line L1. This signal is received, if the line is free from defects, by the relay R2 in the line equipment U11 according to FIG. 1, in which the relays R5–R7 are in operated condition. The relay R2, which receives clearing signals in the line equipment U11, operates and its contacts 21–22 are actuated. Hereby the relays R6 and R7 release while R5 is kept energized through its upper winding and the relay R3, which is intended for the sending of clearing signals from the line equipment U11, is operated in a circuit through the contacts 21 and 41. The receiving of a clearing signal in the line equipment, thus, causes sending of a clearing signal in the opposite direction, i.e., a clearing signal is sent from both ends of the junction line simultaneously.

The following circuit is completed: +, contacts 21, 41, 42 and 63, the upper winding of the relay R4 and of the capacitor C1 respectively and the lower winding of relay R4, to negative. The windings of the relay R4 counteract each other, and, therefore, R4 does not operate before C1 has been charged. Hereby the contacts 41–43 are actuated and R4 is kept operated while the capacitor C1 is discharged, whereby the two windings of the relay R4 interact. The relay R4 will, thus, operate and break contacts 41, so that the relay R3 is caused to send out repeated clearing signals. The relay R2 will, however, release its armature as soon as the clearing signal from one or the other side is interrupted. Then the disconnecting process is terminated. As long as clearing signals are sent out, one of the contacts 32 and 43 keeps a circuit for a time alarm arrangement AL in closed condition.

If one of the clearing signals does not proceed through the junction line owing to some fault, for example interruption on the line, the clearing signal from at least one side will remain on the line uninterrupted, until the fault has been remedied. The time alarm arrangement AL is operated by means of the contacts 32, 43. If the calling signal from the register REG1 has been answered by the register REG2 and a connection has been set up between the telephone exchange I and the telephone exchange II, the relays R5–R7 in the line equipment U11 and U21 are in operated condition. The connection can be disconnected at any time from any of the telephone exchanges. By way of example the register REG2 finds reason to disconnect the connection. The circuit through the wire *c*1 in the line equipment U21 is interrupted and the relay R7 releases. The contact 71 is opened and the contact 72 is closed. The relay R3 operates and the relay R5 is held in a circuit through the contacts 72 and 62. A clearing signal is sent out through the contact 31 and the line conductor *b*1. If the signal reaches the line equipment U11, the relay R2 in this will be operated, upon which the disconnecting process described above takes place.

After the register REG2 has received digit signals from REG1, a connection is set up in the telephone exchange II, for example between the line L1 and L2. The register REG2 connects itself to the marker M and indicates the traffic direction to which line L2 belongs. By means of the finder RS2 the line L1 is identified. The marker selects the line L2 and an idle link SR and sets the selectors SA and SB. Hereby the holding relays SRA and SRB in the link SR are operated in circuits from positive in the marker M. The contacts 211–214 and 221–224 are actuated. The positive potential from the marker causes operation of the relays R6–R7 in the line equipments U21–U22 through the following circuits: +, the contacts 214 and 224, 223 respectively and 213 respectively, the selectors SB and SA respectively, the wires *c*2 and *c*1 respectively, the upper winding of the relays R7, the rectifier *e*1, the winding of the relays R6 to negative. Then the marker M is disconnected. The relay SRB is, like the relays R6 and R7, held in the line equipment U21 in a circuit from +, contact 22, resistance *r*3, contact 61, rectifier *e*2, the upper winding of relay R7, the wire *c*1, the selector SA, the contacts 213 and 224, the winding of relay SRB, to negative. A corresponding circuit is closed for holding of the relay SRA from the line equipment U22.

The set connection can be disconnected from any of the junction lines L1 and L2. A clearing signal which operates the relay R2 in one of the two line equipments U21, U22, interrupts the current for the corresponding holding relay SRB or SRA, which relay releases and interrupts the current for both relays SRA, SRB, after which a clearing signal is sent out from both line equipments U21, U22 as has been described above.

In FIG. 4 the junction line L1 is a 4-conductor line and connected to a line equipment through two transformers T1 and T2, one for each speaking direction. The line equipment is connected to an automatic telephone exchange designed according to the time division multiplex principle in such a way that particular conductors AF and BF respectively are provided for each speaking direction, which conductors are common to a number of lines. Each line has two primary contacts AK1 and BK1 respectively, one for each speaking direction and for the conductors AF, BF respectively. Each a-conductor, AF, in the automatic axchange can be connected to each b-conductor, BF, through a secondary contact CK.

For receiving of calling and clearing signals there are provided in each line equipment a voice frequency receiver TM and a bandpass filter F which transmits a determined voice frequency. For sending of clearing signals a valve 101 for the connection of a voice frequency generator RT to the junction line is provided. The clearing signal can be changed from a permanent voice frequency signal to an intermittent voice frequency signal with the help of a not-circuit 111, a valve 102 and a generator IRT which sends the same frequency as the voice frequency from RT. In order to differ calling signals from clearing signals there is a time arrangement consisting of a contact chain 1–60 stepped with the help of pulses from a scanner SC, which is common to a number of junction lines. In the line equipment are furthermore included and-circuits 105, 109, not-circuits 103, 108, or-circuits 107, 110, bistable circuits 120–122 and monostable circuits 104, 106.

A calling signal coming from the junction line L1 opens the circuit 103, so that time determined impulses, for example a pulse every 10th millisecond, from the scanner SC reach the contact chain 1–60 which is stepped forward one stage for each impulse. After six impulses a calling circuit is closed through the not-circuit 108, the wire *t*2, to the marker M. The marker M selects a register REG2 and a pulse position and sets the contacts AK1, BK1 and AK2, BK2 for the selected pulse position. At the same time the number of the calling line is transmitted to REG2 and is registered in the register. The calling signal from the line L1 now passes the transformer T1, the wire *a*, the contact AK1, the conductor AF, the contact AK2 to a voice frequency receiver in the register. From REG2 an answering signal is sent through the contact BK2, the conductor BF, the contact BK1, the wire *b* and the transformer L1, to the calling register REG1 in FIG. 1. When the answering signal is received in REG1, the calling signal is interrupted. When the marker M has connected the register REG2, a signal is sent through the wire *t*1 to the bistable circuit 120, which is operated and blocks the not-circuit 108, so that the marker is released.

During the calling signal the mono-stable circuit 104 has been operated so that, when the signal ceases, it gives a current impulse to all operated stages in the chain 1–60, whereby these are restored. The communication is hereby set up and can hereafter be disconnected from any side.

If it is supposd that the clearing signal comes from the line L1 and operates the voice frequency generator TM, the contact chain 1–60 will be stepped forward by means of impulses from the scanner SC. After 30 impulses the stage 30 is operated, the bistable circuit 121 is operated and the marker M is called through the wire *t*4, which shows that the connection through the line L1 has to be disconnected. The marker carries out the disconnection by resetting the contacts AK1, BK1 and AK2, BK2. The bistable circuit 121 operates the mono-stable circuit 106, so that a current impulse is sent out immediately through the or-circuit 107 to the time arrangement 1–60, whereby this is restored to the initial position. The circuit 103 is closed and the circuit 105 is opened. The time arrangement starts again from the stage 1, this time with impulses from SC passing through the and-circuit 105. The bistable circuit 121 closes also a circuit through the or-circuit 110 and the not-circuit 111 to the valve 101 that is opened. Voice frequency current is sent out from the voice frequency generator RT through the valve 101, the wire *b*, the transformer T2 to the line L1. The voice frequency from the generator RT causes a clearing signal.

The line equipment in the other end of the line L1 receives the signal, whereby its voice frequency receiver TM is operated and its mono-stable circuit 104 is prepared for sending a current impulse when the signal is ended. The time arrangement at this end of the line is started and operates after 30 stages the bistable circuit 121, upon which the contact chain 1–60 is restored to the initial position through a current impulse from the bistable circuit 106 as has been described above. A disconnecting signal is now sent from both ends of the line. Both contact chains 1–60 are stepped forward and pass the stages 30–43, the markers being connected and carrying out the disconnection, if so has not occurred already. After the stepping contact 43 has been passed, the marker will be released. When the contact 60 is reached, the not-circuit 111 will be closed and therewith also the valve 101, while the valve 102 is opened. At the first interruption of the clearing signal also the mono-stable circuit 104 is released in that line equipment which receives the clearing signal. A current impulse goes out on one hand through the or-circuit 107 to the stepping contacts 1–60 which are reset, on the other hand through the and-circuit 109 to the bistable circuits 120, 121, 122 which are set to zero position. The valves 101, 102 are closed, and, therefore, the same process takes place in the line equipments of both lines L1.

If the register REG2 begins the disconnecting process, the register connects itself to the marker M, indicates the number of the line L1 and that a disconnection is intended. The marker M closes the contacts AK1, BK1 and AK2, BK2 and sends a current impulse to the bistable circuit 122. The valve 101 is opened through a circuit from 122 through the or-circuit 110 and the not-circuit 111. Clearing signal is sent from the voice frequency generator RT through the valve 101, the wire *b* and the transformer T2, to the line L1, after which the process will agree with the description above.

I claim:

1. In a telephone system, two exchanges interconnected by a trunk line, switch means in each of said exchanges being connected to said trunk line at a call between the two exchanges; at each end of the trunk line an equipment comprising signalling means disposed to be actuated by said switch means, sending means for sending signals through the trunk line and means for receiving signals from the trunk line; said signalling means actuating said sending means to send a continuous release signal when said switch means in the exchange at the end of a call are disconnected from the line, a contact means operated by said receiving means at the receiving of a release signal from the trunk line; said contact means when operated actuating said sending means with preference over said signalling means to send release signals through the trunk line at intervals until said continuous release signal received from the trunk line ceases.

2. In a telephone system, two exchanges interconnected by a trunk line, switch means in each of said exchanges being connected to said trunk line at a call between the two exchanges; at each end of the trunk line an equipment comprising holding means and signalling means disposed to be actuated by said switch means, sending means for sending signals through the trunk line and means for receiving signals from the trunk line; said signalling means actuating said sending means to send a continuous release signal when said switch means in the exchange at the end of a call are disconnected from the line, a contact means operated by said receiving means at the receiving of a release signal from the trunk line; said contact means when operated releasing said holding means and actuating said sending means with preference over said signalling means to send release signals through the trunk line at intervals until said continuous release signal received from the trunk line ceases.

References Cited in the file of this patent

UNITED STATES PATENTS 2,409,164 Taylor et al. ______________ Oct. 8, 1946